(12) United States Patent
Isaksson et al.

(10) Patent No.: US 11,281,975 B1
(45) Date of Patent: Mar. 22, 2022

(54) CREATING AND MODIFYING MACHINE LEARNING MODELS IN A MODEL TRAINING ENGINE

(71) Applicant: PerceptiLabs AB, Stockholm (SE)

(72) Inventors: Martin Isaksson, Täby (SE); Robert Erik Lundberg, Lidingö (SE)

(73) Assignee: PerceptiLabs AB, Stockholm (SE)

( * ) Notice: Subject to any disclaimer, the term of this patent is extended or adjusted under 35 U.S.C. 154(b) by 199 days.

(21) Appl. No.: 16/580,491

(22) Filed: Sep. 24, 2019

(51) Int. Cl.
| | |
|---|---|
| *G06F 3/0486* | (2013.01) |
| *G06N 3/08* | (2006.01) |
| *G06N 20/00* | (2019.01) |
| *G06F 3/0483* | (2013.01) |
| *G06F 3/0482* | (2013.01) |

(52) U.S. Cl.
CPC ........... *G06N 3/084* (2013.01); *G06F 3/0482* (2013.01); *G06F 3/0483* (2013.01); *G06F 3/0486* (2013.01); *G06N 20/00* (2019.01)

(58) Field of Classification Search
CPC .... G06F 3/0482; G06F 3/0486; G06F 3/0483; G06N 3/084; G06N 20/00
See application file for complete search history.

(56) References Cited

U.S. PATENT DOCUMENTS

| | | | | |
|---|---|---|---|---|
| 7,174,370 B1 * | 2/2007 | Saini | ........................ | G06F 8/36 709/220 |
| 2017/0017903 A1 * | 1/2017 | Gray | ........................ | G06F 3/14 |
| 2018/0060759 A1 * | 3/2018 | Chu | ........................ | G06N 20/00 |
| 2018/0307978 A1 * | 10/2018 | Ar | ........................... | G06N 5/022 |
| 2019/0038148 A1 * | 2/2019 | Valys | ..................... | G16H 40/67 |
| 2020/0034665 A1 * | 1/2020 | Ghanta | ..................... | G06K 9/03 |
| 2020/0125961 A1 * | 4/2020 | Agrawal | ................ | G06N 5/003 |
| 2020/0380301 A1 * | 12/2020 | Siracusa | ................... | G06F 8/34 |
| 2020/0398083 A1 * | 12/2020 | Adelsheim | ............... | G06N 3/08 |
| 2021/0055915 A1 * | 2/2021 | Guo | .......................... | G06F 8/34 |
| 2021/0073583 A1 * | 3/2021 | Dagan | .................. | G06K 9/6257 |

OTHER PUBLICATIONS

Deep Cognition, Inc.—Deep Cognition webpages, retrieved on Oct. 23, 2020 from https://deepcognition.ai/, 2017, pp. 1-7.

(Continued)

*Primary Examiner* — Rashawn N Tillery
(74) *Attorney, Agent, or Firm* — McDermott Will & Emery LLP

(57) ABSTRACT

A method for creating one or more machine learning models in a model training engine is provided. The method includes providing to a user, via a graphical user interface, a selection of components for a machine learning model, at least one component having a computational layer including one or more coefficients associated with a component attribute. The method also includes displaying, in the graphical user interface, a component selected by the user, including a selected value of the component attribute and executing the machine learning model with a training archive as an input, to obtain an output indicative of a desired feature of the training archive. The method also includes comparing the output with a desirable feature value, and modifying at least one coefficient in the component of the machine learning model based on a difference between the output from the machine learning model and the desirable feature value.

20 Claims, 13 Drawing Sheets

(56) References Cited

OTHER PUBLICATIONS

Peltarion Ab—The Essential AI Handbook for Leaders, retrieved on Oct. 23, 2020 from http://www.peltarion.com/ai-handbook, 2018, pp. 1-59.
Quintero, et al.—IBM PowerAI: Deep Learning Unleashed on IBM Power Systems Servers, IBM Corp, 2018, retrieved on Oct. 23, 2020 from http://www.redbooks.ibm.com/redbooks/pdfs/sg248409.pdf; pp. i.-260; ISBN 0738442941.
SONY—Neural Network Console Training Manual (online), IBM Corp, retrieved on Oct. 23, 2020 from https://support.dl.sony.com/docs/, Sep. 2018, 251 pages.
SONY—Neural Network Console webpages, IBM Corp, retrieved on Oct. 23, 2020 from https://dl.sony.com/, Sep. 2018, 245 pages.
Takahashi, S.,—We released Neural Network Console—Windows Version 1.50, Neural Network Console Blog, Jul. 30, 2019, pp. 1-8.

\* cited by examiner

CREATING AND MODIFYING MACHINE LEARNING MODELS IN A MODEL TRAINING ENGINE

BACKGROUND

Field

The present disclosure generally relates to a model training engine for creating and/or modifying a machine learning model. More specifically, the present disclosure relates to a graphical user interface for creating, updating, training, and testing a model with the model training engine.

Description of the Related Art

Machine learning algorithms are being used in a widening range of fields. As a result, the coding of these complex algorithms has become a niche application for savvy computer scientists or experienced programmers well versed in various source code languages. While this trend leaves aside a number of people who may know best how to apply the algorithm to solve a specific problem, it also hinders the work of even the most savvy of experts when attempting to work with inconsistent databases or programming templates. Accordingly, it is desirable to have a common platform for accessing a model training engine by non-experts and experts alike, who can access, use, test, and create machine learning models, new and already existing. Programming experts would benefit from such platform for its ability to incorporate already existing models in a variety of source code resources, the simple visualization of results, debugging, and the ability to combine multiple machine learning schemes to solve a specific problem.

SUMMARY

In one embodiment of the present disclosure, a computer-implemented method is described for creating one or more machine learning models in a model training engine. The computer-implemented method includes providing to a user, via a graphical user interface, a selection of components for a machine learning model, at least one component having a computational layer including one or more coefficients associated with a component attribute. The computer-implemented method also includes displaying, in the graphical user interface, a component selected by the user, including a selected value of the component attribute and executing the machine learning model with a training archive as an input, to obtain an output indicative of a desired classification of the training archive. The computer-implemented method also includes comparing the output with a desirable feature value, and modifying at least one coefficient in the component of the machine learning model based on a difference between the output from the machine learning model and the desirable feature value.

According to one embodiment, a system is described that includes one or more processors and a memory coupled to the one or more processors, the memory including instructions that, when executed by the one or more processors, cause the one or more processors to provide to a user, via a graphical user interface, a selection of components for a machine learning model, at least one component having a computational layer including one or more coefficients associated with a component attribute. The one or more processors also execute instructions to display, in the graphical user interface, a component selected by the user, including a selected value of the component attribute, to form an executable model based on the machine learning model including the component selected by the user and the selected value of the component attribute, and to execute the machine learning model with a training archive as an input, to obtain an output. The one or more processors also execute instructions to compare the output with a desirable feature value and to modify at least one coefficient in the component of the machine learning model based on a difference between the output from the machine learning model and the desirable feature value.

According to one embodiment, a non-transitory, machine-readable medium is described that includes instructions, which when executed by one or more processors, cause a computer to perform a method, including providing to a user, via a graphical user interface, a selection of components for a machine learning model, at least one component having a computational layer including one or more coefficients associated with a component attribute. The method also includes displaying, in the graphical user interface, a component selected by the user, including a selected value of the component attribute, forming an executable model based on the machine learning model including the component selected by the user and the selected value of the component attribute, and executing the machine learning model with a training archive as an input, to obtain an output. The method also includes comparing the output with a desirable feature value, modifying at least one coefficient in the component of the machine learning model based on a difference between the output from the machine learning model and the desirable feature value, and alerting the user, via a graphic indicator, of a compiling error in the machine learning model, including a graphical explanation of an error source.

In yet another embodiment, a system is described that includes a means for storing commands and a means for executing the commands causing the system to perform a method that includes providing to a user, via a graphical user interface, a selection of components for a machine learning model, at least one component having a computational layer including one or more coefficients associated with a component attribute. The method also includes displaying, in the graphical user interface, a component selected by the user, including a selected value of the component attribute, forming an executable model based on the machine learning model including the component selected by the user and the selected value of the component attribute, and executing the machine learning model with a training archive as an input, to obtain an output. The method also includes comparing the output with a desirable feature value, modifying at least one coefficient in the component of the machine learning model based on a difference between the output from the machine learning model and the desirable feature value, and alerting the user, via a graphic indicator, of a compiling error in the machine learning model, including a graphical explanation of an error source.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

In the figures, elements and steps denoted by the same or similar reference numerals are associated with the same or similar elements and steps, unless indicated otherwise.

DETAILED DESCRIPTION

Figure 1:
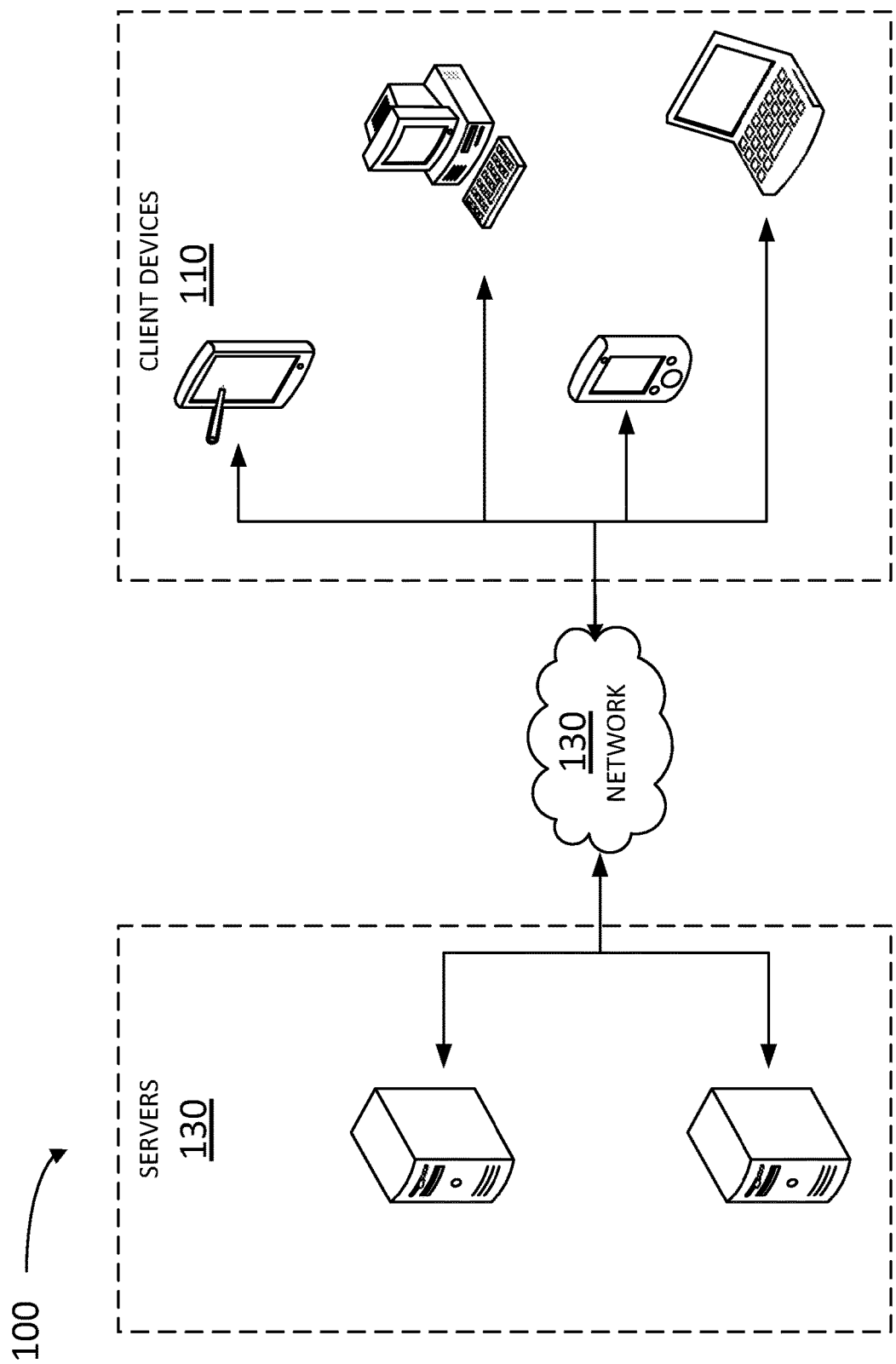
FIG. 1 illustrates an example architecture suitable for accessing a model training engine, according to some embodiments.

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

General Overview

As used herein, the term "content item" may be used, for example, in reference to a digital file that is composed of one or more media elements of different types (text, image, video, audio, and the like). A content item can be a single picture, a single video file, an audio file, or any combination of the above. The term "image identifier" as used herein may refer to a form of metadata such as a tag and a label, or a search query associated with an image for identifying the image.

The present system provides a technical solution to a problem arising in the technical field of generating and training machine learning models for real-life applications such as self-driving vehicles (e.g., automobiles, airplanes, ships, trains, and the like), automation of fabrication procedures, surgical procedures, text editing, search engines, and heavy data processing (e.g., as in weather prediction, and the like). Moreover, solutions as disclosed herein improve the functioning of a computer by simplifying the steps and documentation typically used in the preparation and training of machine learning models.

The present disclosure relates to a graphical user interface (GUI) for use with a model training engine for machine learning models. Embodiments as disclosed herein are intuitive, graphic oriented GUIs that display the components of a machine learning model as it is being built by the user. In addition, embodiments as disclosed herein may indicate compilation problems and other computational errors in the model as it is being assembled by the user. Moreover, a GUI as disclosed herein enables the user to incorporate standard model packages, and/or add custom made layers, written in the preferred coding language of the user.

A GUI as disclosed herein provides the functionality of dragging, dropping, and connecting components of a machine learning model in a workspace. Thus, a user may quickly create or upload a machine learning model, and have the ability to get a higher level understanding of the different model components. In some embodiments, a highly sophisticated model training engine operates in the background of the GUI, performing multiple mathematical and logic operations. The GUI illustrates for the user simple and intuitive components, while the model training engine ensures that the components are reprogrammable.

In some embodiments, a GUI as disclosed herein visualizes and provides access to the user for each variable in the components, and provides access to the results from each of the components in the machine learning model. The GUI enables a user to easily move model components, group them, and categorize them to ensure that the model maintains a simple topology. In addition, a GUI as disclosed herein may provide a more traditional view and edit tool of machine learning models for users more accustomed to source code handling. Further, in some embodiments, a GUI may swap back and forth between a "Notebook" view, where a user can see the source code of one or more components as in a normal code editing tool (e.g., code line entries).

Some implementations provide a simplified and user-friendly view of training results, including in real time. This enables a user to quickly assess the performance of a given model, and introduce changes in the model, or switch the learning architecture (e.g., include a generative adversarial scheme, a transfer learning scheme, a back-propagation feedback loop, and the like).

The subject system provides several advantages, including a feature for clustering multiple components into a layer container, to facilitate manipulation and handling of large models having intricate topologies.

Example System Architecture

FIG. 1 illustrates an example architecture 100 suitable for accessing a model training engine, according to some embodiments. Architecture 100 includes servers 130 communicatively coupled with client devices 110 over a network 150. One of the many servers 130 is configured to host a memory including instructions which, when executed by a processor, cause the server 130 to perform at least some of the steps in methods as disclosed herein. In some embodiments, the processor is configured to control a graphical user interface (GUI) for the user of one of client devices 110 accessing the model training engine. The model training engine may be configured to train a machine learning model for solving a specific application. Accordingly, the processor may include a dashboard tool, configured to display components and graphic results to the user via the GUI. For purposes of load balancing, multiple servers 130 can host memories including instructions to one or more processors, and multiple servers 130 can host a history log and databases including multiple training archives used for the model training engine. Moreover, in some embodiments, multiple users of client devices 110 may access the same model training engine to run one or more machine learning models. In some embodiments, a single user with a single client device 110 may train multiple machine learning models running in parallel in one or more servers 130. Accordingly, client devices 110 may communicate with each other via network 150 and through access to one or more servers 130 and resources located therein.

Servers 130 may include any device having an appropriate processor, memory, and communications capability for hosting the model training engine including multiple tools associated with it. The model training engine may be accessible by various clients 110 over network 150. Clients 110 can be, for example, desktop computers, mobile computers, tablet computers (e.g., including e-book readers), mobile devices (e.g., a smartphone or PDA), or any other device having appropriate processor, memory, and communications capabilities for accessing the model training engine on one or more of servers 130. Network 150 can include, for example, any one or more of a local area tool (LAN), a wide area tool (WAN), the Internet, and the like. Further, network 150 can include, but is not limited to, any one or more of the following tool topologies, including a bus network, a star network, a ring network, a mesh network, a star-bus network, tree or hierarchical network, and the like.

Figure 2:
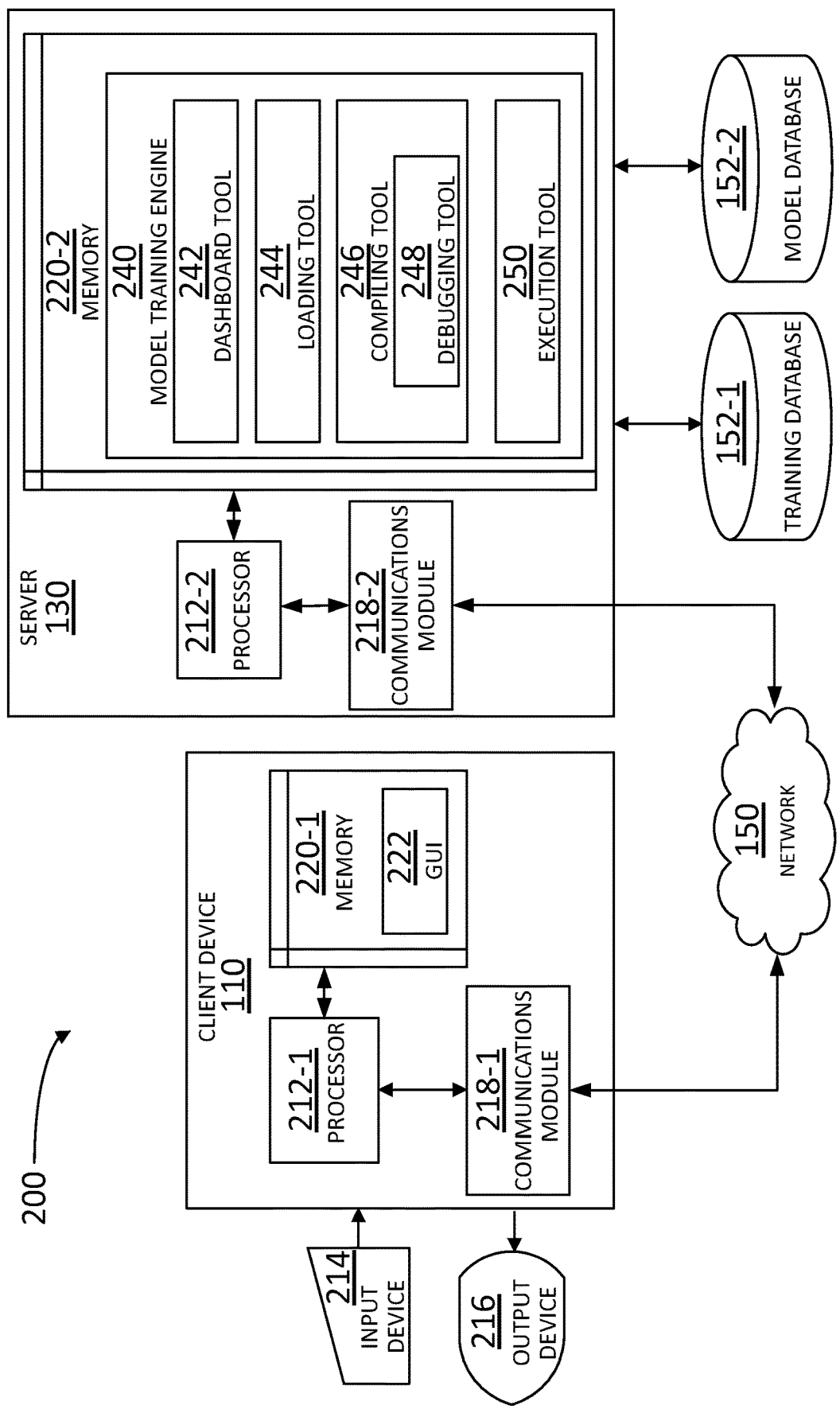
FIG. 2 is a block diagram illustrating an example server and client from the architecture of FIG. 1, according to certain aspects of the disclosure.

FIG. 2 is a block diagram 200 illustrating an example server 130 and client device 110 from the architecture of FIG. 1, according to certain aspects of the disclosure. Client device 110 and server 130 are communicatively coupled over network 150 via respective communications modules 218-1 and 218-2 (hereinafter, collectively referred to as "communications modules 218"). Communications modules 218 are configured to interface with network 150 to send and receive information, such as data, requests, responses, and commands to other devices on the network. Communications modules 218 can be, for example, modems or Ethernet cards. A user may interact with client device 110 via an input device 214 and an output device 216. Input device 214 may include a mouse, a keyboard, a pointer, a touchscreen, a microphone, and the like. Output device 216 may be a screen display, a touchscreen, a speaker, and the like. Client device 110 may include a memory 220-1 and a processor 212-1. Memory 220-1 may include a GUI 222, configured to run in client device 110 and couple with input device 214 and output device 216. GUI 222 may be downloaded by the user from server 130, and may be hosted by server 130.

Server 130 includes a memory 220-2, a processor 212-2, and communications module 218-2. Hereinafter, processors 212-1 and 212-2, and memories 220-1 and 220-2 will be collectively referred to, respectively, as "processors 212" and "memories 220." Processors 212 are configured to execute instructions stored in memories 220. In some embodiments, memory 220-2 includes a model training engine 240. Model training engine 240 may share or provide features and resources to GUI 222, including multiple tools associated with managing a creative project. The user may access model training engine 240 through GUI 222 installed in a memory 220-1 of client device 110. Accordingly, GUI 222 may be installed by server 130 and perform scripts and other routines provided by server 130 through any one of multiple tools. Execution of GUI 222 may be controlled by processor 212-1.

In that regard, model training engine 240 may include a dashboard tool 242, a loading tool 244, a compiling tool 246, a debugging tool 248, and an execution tool 250. Dashboard tool 242 enables a collaborator to access and edit machine learning models (e.g., through GUI 222). For example, in some embodiments, the user may upload a document to server 130 and use dashboard tool 242 to modify, update, or combine a machine learning model with other machine learning models provided by a second, third, or any number of other users. In some embodiments, dashboard tool 242 enables the editing of one or more machine learning models uploaded onto GUI 222 (e.g., through network 150 or training database 252-1). Training database 252-1 includes training archives and other data files that may be used by model training engine 240 in the training of a machine learning model, according to the input of the user through GUI 222. Loading tool 244 provides the ability to upload existing machine learning models, e.g., from a model database 252-2, into GUI 222 for the user. In that regard, training database 252-1 and model database 252-2 (hereinafter, collectively referred to as "databases 252") may be network base databases independent from each other, or may be part of the same database. Moreover, in some embodiments, at least one or more training archives or machine learning models may be stored in either one of memories 220, and the user may have access to them through GUI 222.

Loading tool 244 may be configured to retrieve a machine learning model from model database 252-2 and to translate the inner operations and data of the model into a map that can be displayed, edited, and run natively in GUI 222. Loading tool 244 is configured to provide the imported machine learning model with all the visualization and customization that server 130 provides to a native machine learning model. This allows for a user to take a custom built, non-native model and run it in server 130 via GUI 222. This also allows the user to train the non-native model on more data, or very easily retrain specific parts of the non-native model.

Compiling tool 246 is configured to generate an executable model based on a machine learning model script, as created or modified by the user through GUI 222. In some embodiments, compiling tool 246 may include a debugging tool 248 configured to identify errors and inconsistencies in the executable model. In some embodiments, debugging tool 248 is configured to provide an alert or an error message to the user, so that the user may correct any deficiencies in the machine learning model. Execution tool 250 is configured to execute the executable model for training the machine learning model according to the settings selected by the user through GUI 222.

In some embodiments, the machine learning model may include a neural network (NN), a convolutional neural network (CNN), a generative adversarial neural network (GAN), a deep reinforcement learning (DRL) algorithm, a deep recurrent neural network (DRNN), a classic machine learning algorithm such as random forest, k-nearest neighbor (KNN) algorithm, k-means clustering algorithms, or any combination thereof. More generally, the machine learning model may include any machine learning model involving a training step and an optimization step. Execution tool 250 is then configured to modify coefficients in the different layers of the neural network forming the machine learning model. Execution tool 250 uses a training archive provided from training database 252-1 to modify coefficients according to a desired outcome of the machine learning model. Accordingly, in some embodiments, model training engine 240 is configured to access training database 252-1 to retrieve documents and archives as inputs for the machine learning model. In some embodiments, model training engine 240, the tools contained therein, and at least part of training database 252-1 may be hosted in a different server that is accessible by server 130.

Figure 3:
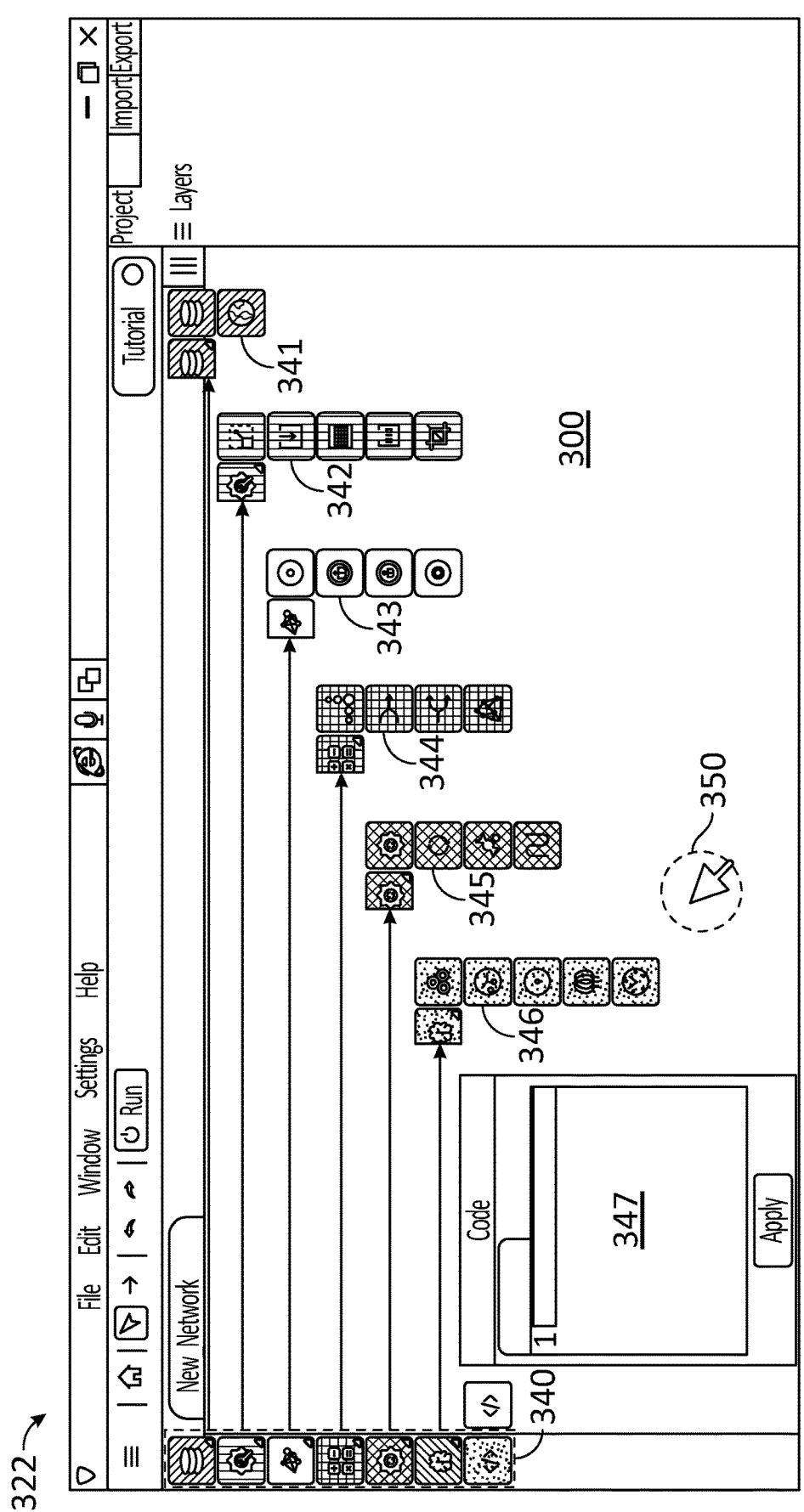
FIG. 3 illustrates different components from a components palette in a workspace panel of a graphic user interface for a model training engine, according to some embodiments.

FIG. 3 illustrates different tools from a components palette 340 in a workspace panel 300 of a graphic user interface 322 for a model training engine, according to some embodiments. GUI 322 includes a drag and drop tool 350 to select and modify components from components palette 340 and place into workspace panel 300, to create a machine learning model. The machine learning model then includes at least one of the components from components palette 340. In some embodiments, components in components palette 340 may be grouped in separate categories, such as: data source components 341, processing components 342, deep learning components 343, operations components 344, model training components 345, machine learning components 346, and custom components 347. Data source components 341 include pointers to folders and drives for accessing training archives and sampling data to be used for training the machine learning model. The training archives may include documents and application files, such as text documents, charts and tables, images, or multi-dimensional data arrays. In some embodiments, data source components 341 may include a web browsing tool for accessing a hyper-text transfer protocol address (http), or any other network address for a database (e.g., training database 252-1), where the training archives may be located.

Processing components 342 may be used to pre-process the training archives prior to handling by the different operational components in the machine learning model. In some embodiments, processing components 342 may include a re-shaping tool to adjust the dimension of an array of pixels, or a cropping tool, to crop certain portions of an image file, a flattening tool (e.g., to convert image pixels into '0's or '1's according to selectable settings), and the like. Deep learning components 343 include operational components such as neural network layers having multiple nodes, each node defined by a response function having multiple inputs and at least one output. Operations components 344 may include components for performing logical or mathematical operations with data to be processed as the input or as the output of one or more deep learning components 343. Model training components 345 include the components that define the character of the machine learning model and the mechanism by which the coefficients of deep learning components 343 are modified and adjusted in a training session. Model training components 345 may be configured for a neural network, a reinforcement network, a genetic algorithm, and a dynamic routing algorithm. In some embodiments, model training components 345 may include a back-propagation tool configured to feed back the output of a machine learning model and adjust the coefficients in the deep learning tool so as to recover an input that closely matches a training archive. Machine learning components 346 may include operations such as clustering and other higher level operations used in machine learning models beyond neural networks. Custom components 347 include customized components that may be created by the user for a specific application of the machine learning model, and that may be stored locally in the memory of the client device, or in an external database (e.g., machine learning database). In some embodiments, components palette 340 may be re-configured with more components, within each of the above mentioned categories, or even new categories of components.

Figure 4:
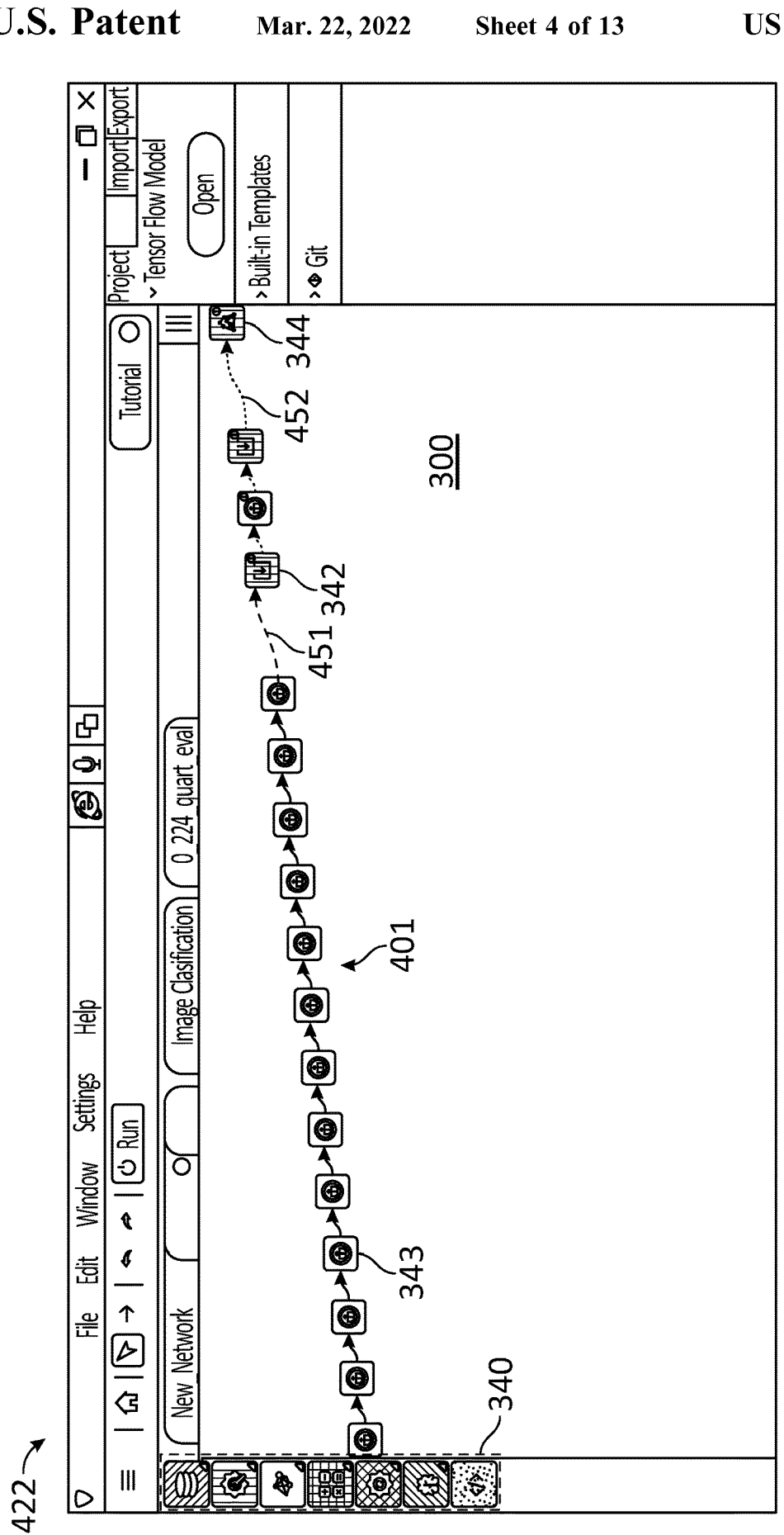
FIG. 4 illustrates an edit action with a graphic user interface to modify a machine learning model in a model training engine, according to some embodiments.

FIG. 4 illustrates an edit action with a graphic user interface 422 to modify a machine learning model 401 in a model training engine, according to some embodiments. In some embodiments, the user may have created machine learning model 401 by dragging and dropping deep learning components 343, processing components 342, and operations components 344 from components palette 340 in workspace panel 300. In some embodiments, GUI 422 displays the dimensionality of every component as a text above the components. The dimensionality is shown to give an overview of the data flow throughout machine learning model 401. The dimensionality can also be used to search and debug errors stemming from a dimension mismatch somewhere in the model. Further, GUI 422 allows the user to modify machine learning model 401 by removing one of the components and "re-wiring" the neighboring components accordingly, through a connector 451. In some embodiments, a compiling tool (e.g., compiling tool 246) working in the background may identify a data flow problem (e.g., due to dimensional incompatibility between adjacent neural network layers, and the like), and thus GUI 422 may illustrate a connector 452 in a different color. Accordingly, the user may identify errors and debug machine learning model 401 in real time, as it is built from scratch or is being modified.

Figure 5:
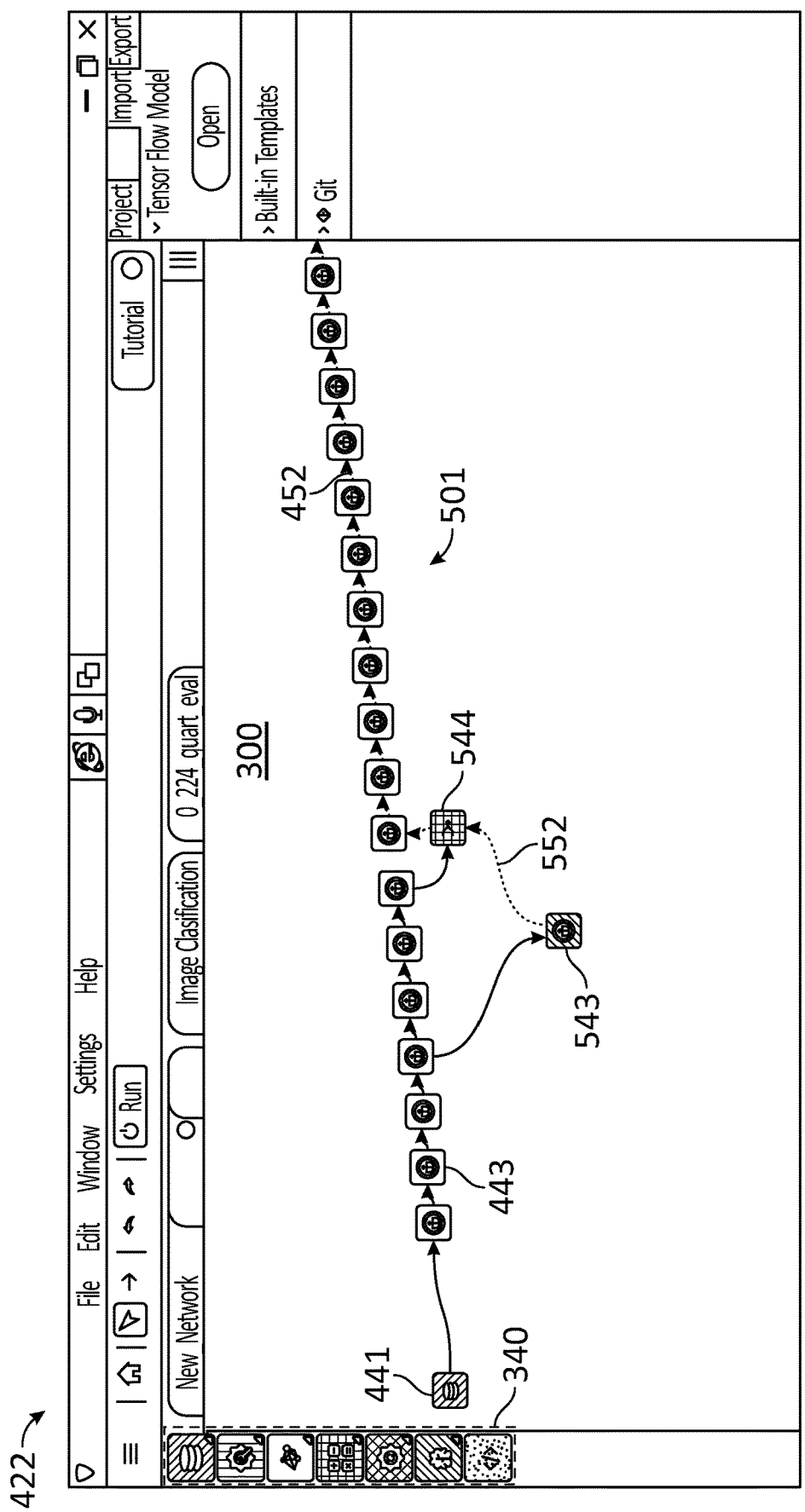
FIG. 5 illustrates a second edit action with a graphic user interface to modify a machine learning model in a model training engine, according to some embodiments.

FIG. 5 illustrates a second edit action with graphic user interface 422 to modify a machine learning model 501 in a model training engine, according to some embodiments. Machine learning model 501 may be the result of certain modifications to machine learning model 401 and includes a data source component 441. In some embodiments, the user may modify machine learning model 401 by dragging and dropping deep learning component 543 and operations component 544 from components palette 340 in workspace panel 300. As can be seen, deep learning component 543 and operations component 544 form a bypass over a number of other components (e.g., deep learning components 443) in machine learning model 501. As a result of the operations, some of the connectors 451, 452, and 552 may have some issues that the user can easily identify from the display in GUI 422. In some embodiments, the user may be able to select and use one or more, or all of the variables from a previous layer (e.g., deep learning components 543) when coding or modifying a current layer in machine learning model 501.

Figure 6:
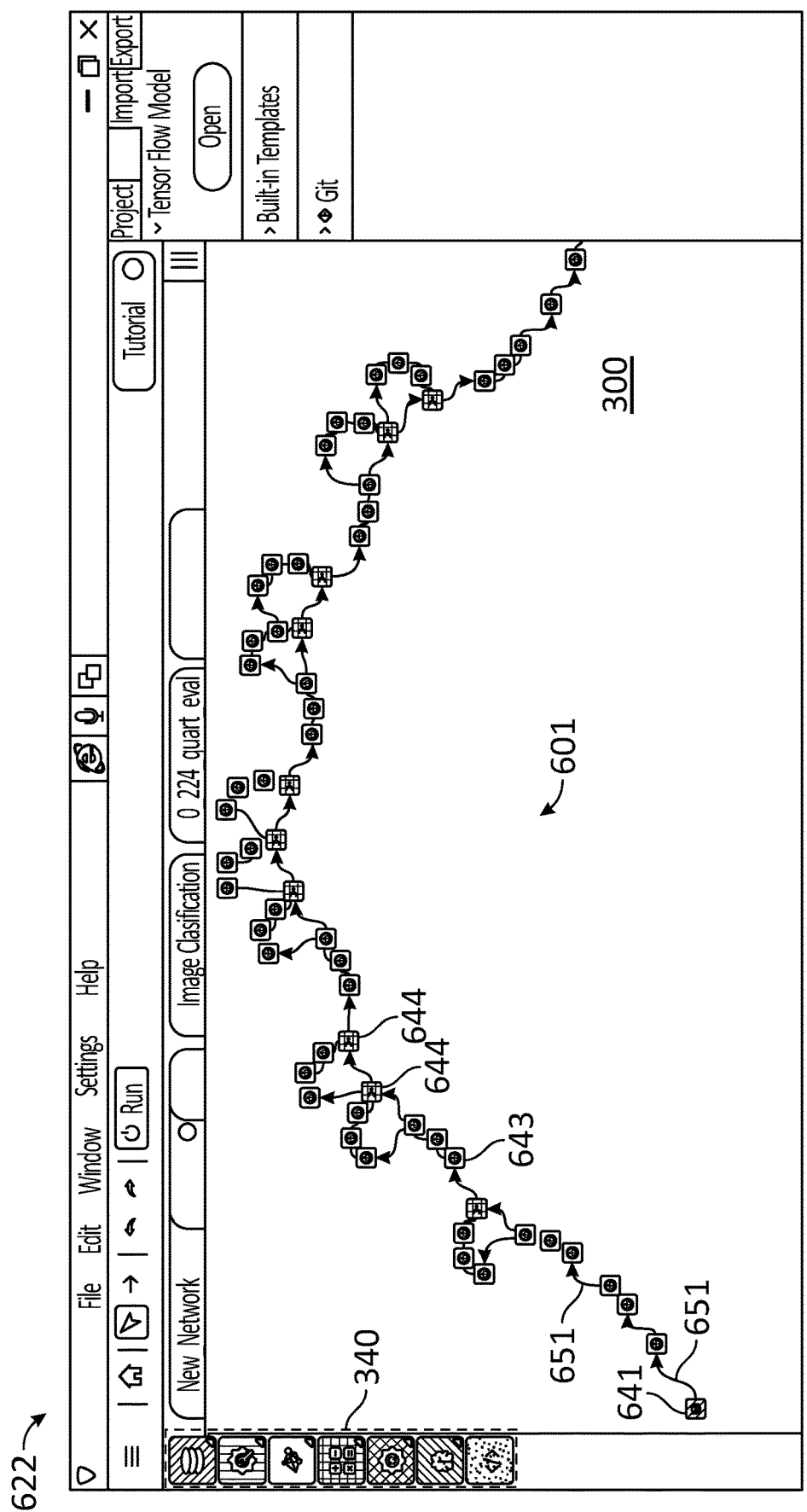
FIG. 6 illustrates a workspace panel in a graphic user interface with a machine learning model to be trained with a model training engine, according to some embodiments.

FIG. 6 illustrates a workspace panel in a graphic user interface 622 with a machine learning model 601 to be trained with a model training engine, according to some embodiments. Machine learning model 601 may be a newly created model by the user incorporating into workspace 300: data source component 641, deep learning components 643, operations components 644, and the like from components palette 340, using a drag and drop tool. Using the drag and drop tool, the user may also connect the components with connectors 651, to create the machine learning model. In some embodiments, machine learning model 601 may have been uploaded from a machine learning database (cf. loading tool 244 and model database 252-2). As can be appreciated, GUI 622 enables the handling of a machine learning model having any topology that the user desires.

Figure 7:
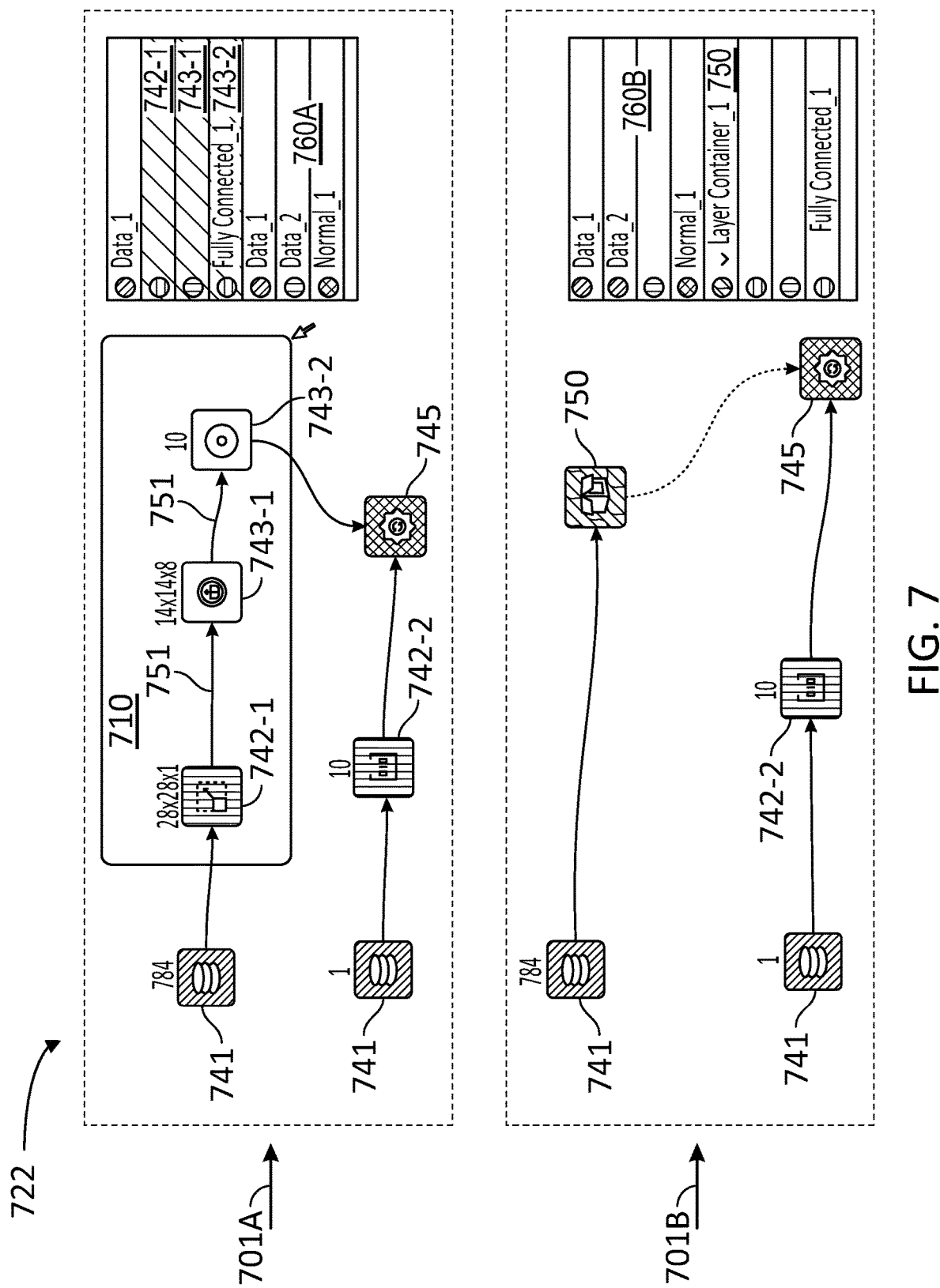
FIG. 7 illustrates a layer container tool from a workspace panel in a graphic user interface for editing a machine learning model to be trained with a model training engine, according to some embodiments.

FIG. 7 illustrates a layer container tool 710 from a workspace panel 300 in a GUI 722 for editing a machine learning model 701A to be trained with a model training engine, according to some embodiments. Machine learning model 701A includes data source components 741, processing components 742-1 and 742-2 (hereinafter, collectively referred to as "processing components 742"), and deep learning components 743-1 and 743-2 (hereinafter, collectively referred to as "deep learning components 743"). Moreover, a training branch for machine learning model 701A may include a link to a training archive from data source component 741, coupled to processing component 742-2. A model training component 745 compares the output from the last layer in machine learning model 701A (e.g., deep learning component 743-2) with a ground-truth value retrieved from processing component 742-2.

In some embodiments, a user may desire to simplify the handling of all the components in machine learning model 701A by grouping two or more components into a layer container 750 (e.g., processing component 742-1 and deep learning components 743), using layer container tool 710. The usefulness of layer container tool 710 may be appreciated when looking at complex topologies that a user may desire to handle in an efficient manner (cf. machine learning model 601). Layer container 750 is only a visual attribute from GUI 722, as any connections 751 between the components inside layer container 750 remain the same. Accordingly, a new machine learning model 701B has the same attributes as machine learning model 701A, and it includes only two graphic elements.

The user can now double click on layer container 750 to display deep learning components 743 and processing component 742-1 without ungrouping it. In some embodiments, the user may right click and select "Ungroup," to remove layer container 750 and place the previously hidden components back on the workspace. In some embodiments, GUI 722 includes layer panels 760A and 760B (hereinafter, collectively referred to as "layer panels 760"), wherein the existence and content of layer container 750 is clearly indicated by highlights and selectable menu options.

Figure 8:
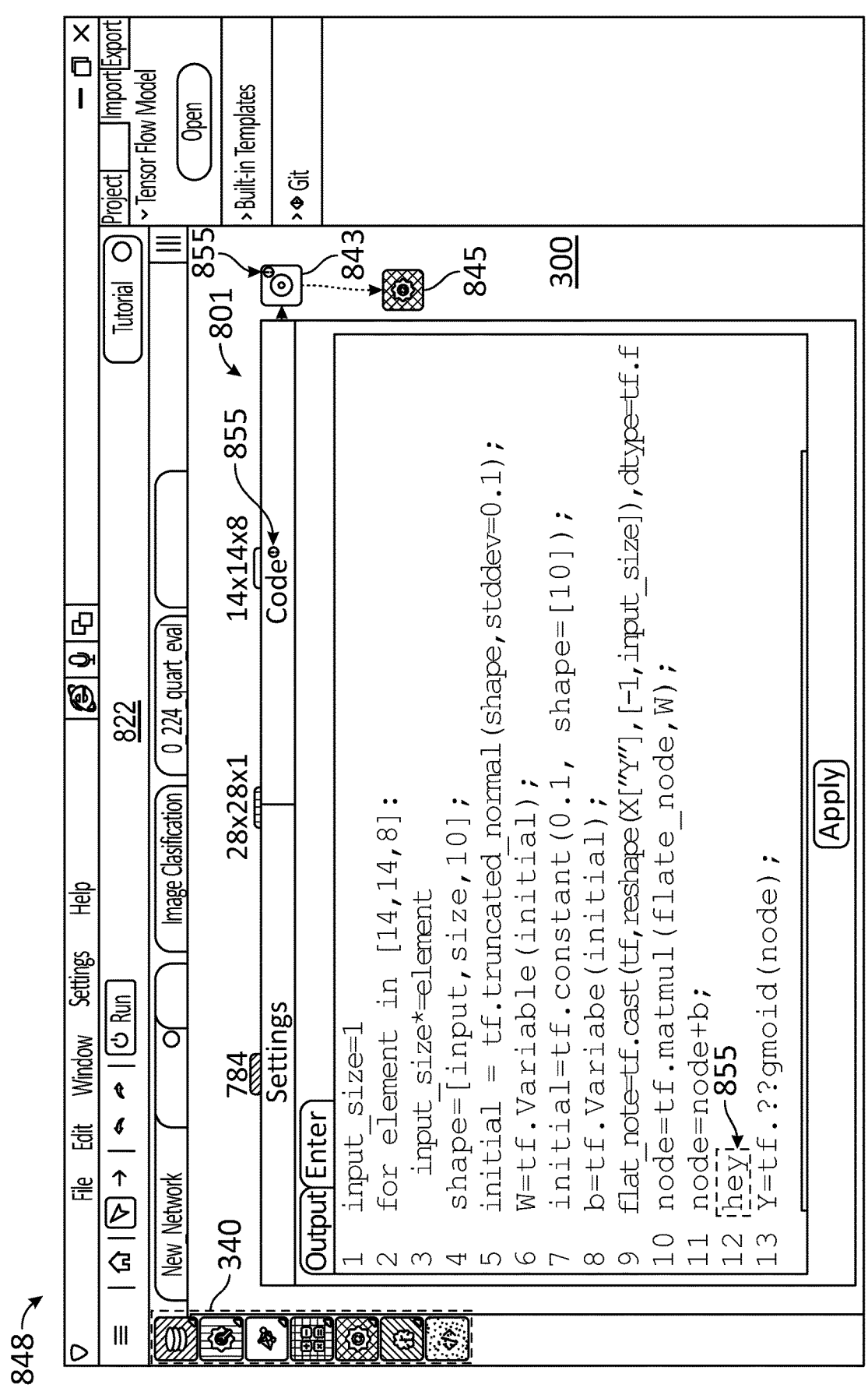
FIG. 8 illustrates a debugging tool from a workspace panel in a graphic user interface when compiling a machine learning model to be trained with a model training engine, according to some embodiments.

FIG. 8 illustrates a debugging tool 848 from a workspace panel 300 in a GUI 822 when compiling a machine learning model 801 to be trained with a model training engine, according to some embodiments. Machine learning model 801 may include deep learning component 843, and a model training component 845, selected with a drag and drop tool from components palette 340. In some embodiments, a visual indicator 855 on the icon of one of the components (e.g., deep learning component 843) may indicate a compiling error in the component. The debugging tool may be part of a compiling tool working in the background of GUI 822 (cf. compiling tool 246 and debugging tool 248).

In addition to indicating the error to the user, GUI 822 allows the user to open a preview 850 of the component in a source code format. The Error message is shown inside of the "Code" tab and highlights where in the code something went wrong (visual indicator 855). The user may edit the script directly on GUI 822 in a notebook view, which may then compile the edited model and clear the error, when resolved. In the notebook view, the user sees the selected components in a source code editor. Preview, Dimension, and Error features of GUI 822 still exist in the notebook view. In some embodiments, GUI 822 may apply a color code to highlight different parts of the code, which correlate to different components. When the user swaps back to workspace panel 300, any new components created in the notebook view will automatically be placed therein.

Figure 9A:
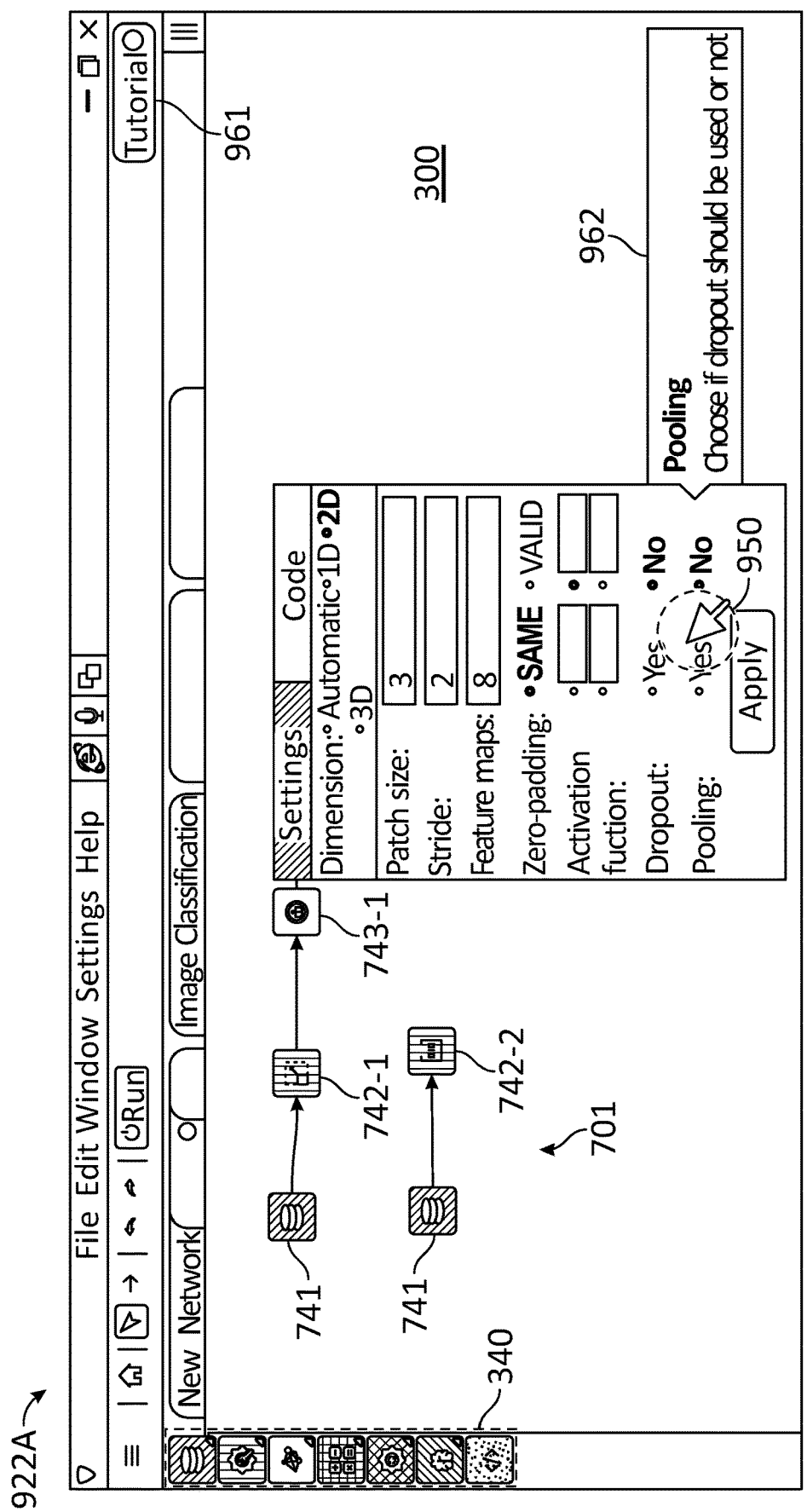
FIGS. 9A-9B illustrate a tutorial tool from a workspace panel in a graphic user interface when compiling a machine learning model to be trained with a model training engine, according to some embodiments.
Figure 9B:
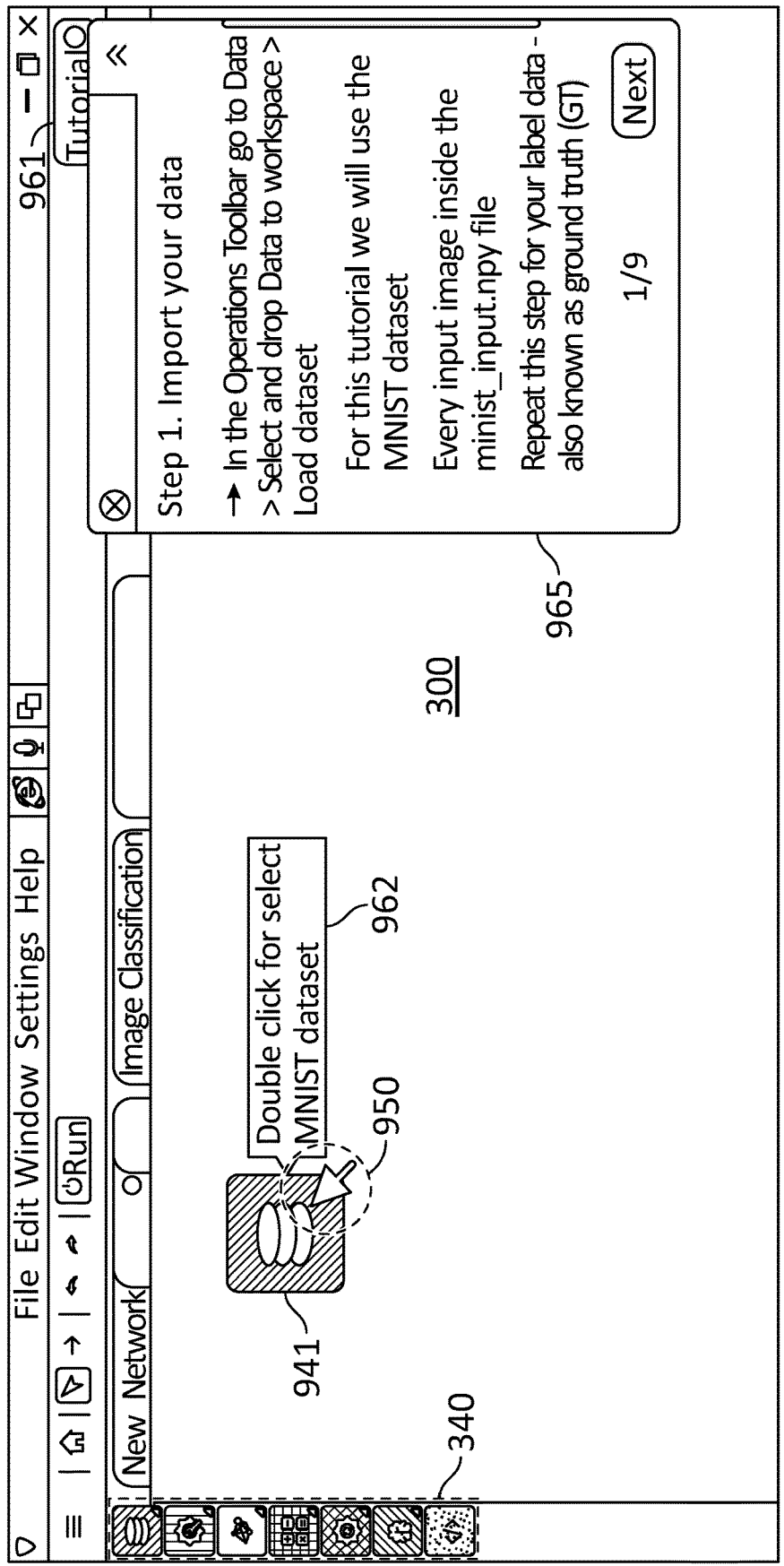

FIGS. 9A-9B illustrate a tutorial tool 961 from a workspace panel 300 in a GUI 922A or 922B (hereinafter, collectively referred to as "GUIs 922") when compiling a machine learning model to be trained with a model training engine, according to some embodiments. The components in GUIs 922 may be retrieved from components palette 340, consistent with embodiments disclosed herein. A data source component 741 and deep learning components 742 are as described above (cf. FIG. 7). As the user scrolls with a drag and drop tool 950 over the different attributes in GUIs 922, a banner 962 provides context help for the attribute.

FIG. 9A illustrates GUI 922A, including machine learning model 701, in workspace panel 300. The user may open up a panel for deep learning component 743-1.

FIG. 9B illustrates GUI 922B where the user scrolls drag and drop tool 950 over a data source component 941, to obtain a brief context explanation of the component and its attributes. GUI 922B further displays a balloon 965 for more in-depth explanation of the selected component and its attributes.

Figure 10:
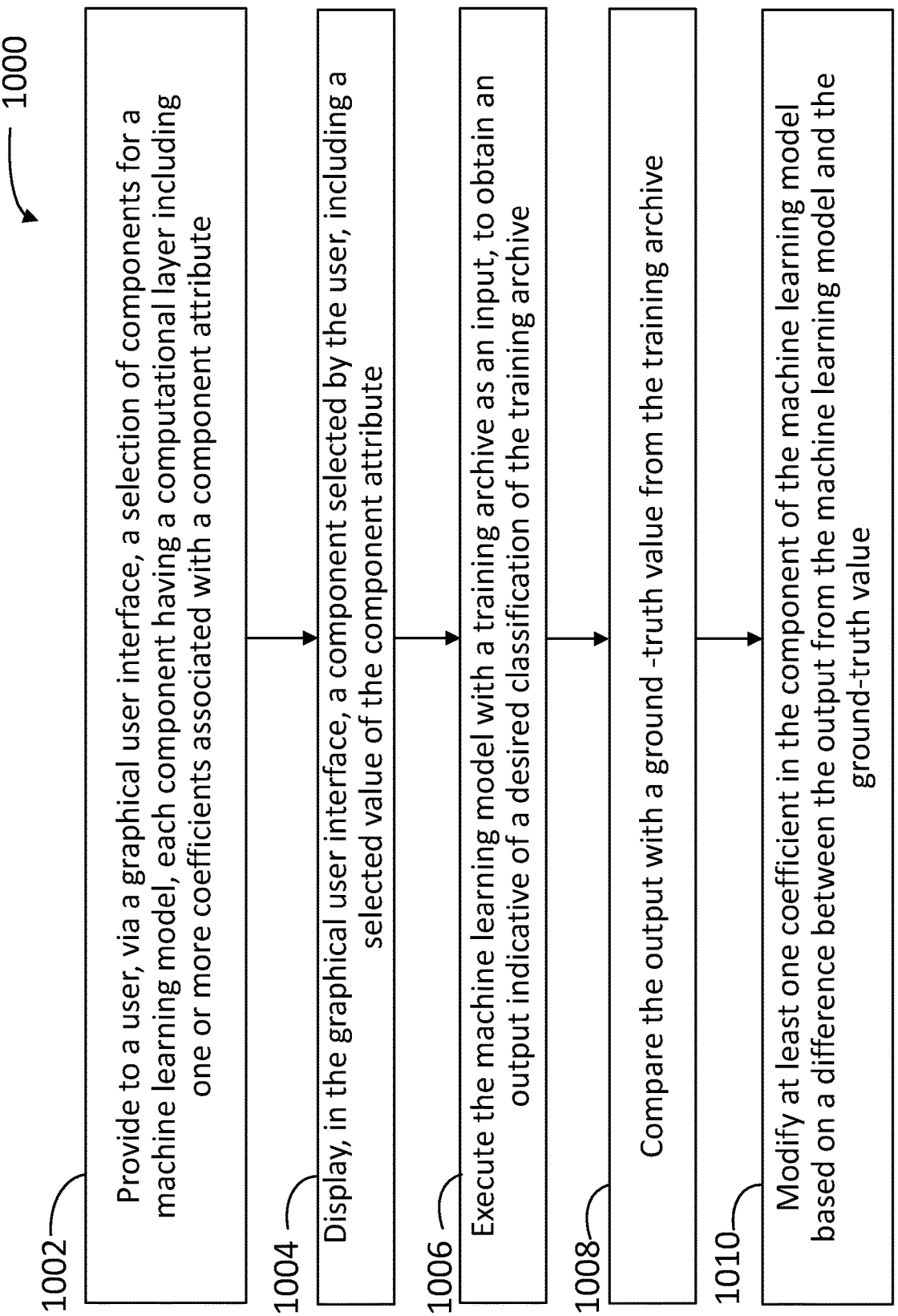
FIG. 10 is a flow chart illustrating steps in a method for creating one or more machine learning models in a model training engine, according to some embodiments.

FIG. 10 is a flow chart illustrating steps in a method 1000 for creating one or more machine learning models in a model training engine, according to some embodiments. At least one or more of the steps in method 1000 may be performed by a computer system in a client device or a server, the client device and the server being communicatively coupled through a network via a communications module (e.g., client device 110, server 130, network 150, and communications modules 218). The computer system may include a memory storing instructions which, when executed by a processor, perform at least partially one or more of the steps in method 1000 (e.g., processors 212 and memories 220). In some embodiments, one or more steps in method 1000 is at least partially executed by an application installed in the client device and hosted by a model training engine in the server (e.g., GUI 222 and model training engine 240). Further, in some embodiments, one or more of the steps in method 1000 may be performed by a dashboard tool, a loading tool, a compiling tool, an execution tool, and a debugging tool, in the project management engine (e.g., dashboard tool 242, loading tool 244, compiling tool 246, debugging tool 248, and execution tool 250). Further, in some embodiments, data and information used in, or generated by, at least one of the steps in method 1000 may be stored in a database communicatively coupled to, and hosted by, the server (e.g., databases 252). Methods consistent with the present disclosure may include at least one or more of the steps in method 1000 performed in a different order. For example, in some embodiments, steps in method 1000 may be performed simultaneously, quasi-simultaneously, or overlapping in time.

Step 1002 includes providing to a user, via a graphical user interface, a selection of components for a machine learning model, at least one of the components having a computational layer including one or more coefficients associated with a component attribute. In some embodiments, at least one of the components in step 1002 may have no attributes (e.g., a grayscale component, or the custom operations component). In some embodiments, step 1002 includes providing, in the graphical user interface, a components palette that groups the components into different categories including a data source category, a deep learning category, an operations category, a training category, and a machine learning category. In some embodiments, step 1002 includes providing a drag and drop tool to the user, and allowing the user to access a component from a components palette and dropping the component in a workspace panel with the drag and drop tool. In some embodiments, step 1002 includes providing, via the graphical user interface, multiple couplers between two or more components in the machine learning model, wherein each coupler is configured to provide an output from at least a first component as an input to at least a second component. In some embodiments, step 1002 includes grouping one or more components into a layer container for handling the one or more components as a single unit in the graphical user interface.

Step 1004 includes displaying, in the graphical user interface, a component selected by the user, including a selected value of the component attribute. In some embodiments, step 1004 includes alerting the user, via a graphic indicator, of a compiling error in the machine learning model, including a graphical explanation of an error source; and providing to the user, with a tutorial tool in the graphical user interface, a label and an explanatory note for a selected component or component attribute. In some embodiments, step 1004 includes providing to the user, via the graphical user interface, a window to a text editor wherein the user may input textual commands in a source code language. In some embodiments, step 1004 may include providing the user selected settings to a lightweight version of the model training engine (which can either be placed on the client device or on the server). The lightweight version of the model training engine then propagates a sample data through the connected components and calculates an output dimensionality for one or more of the components. In some embodiments, step 1004 includes creating a preview of one or more variables inside one or more components and creating an error message in case something goes wrong. In some embodiments, the lightweight version of the model training engine is included in the compiling tool or the debugging tool.

Step 1006 includes executing the machine learning model with a training archive as an input, to obtain an output indicative of a desired classification of the training archive. In some embodiments, step 1006 includes forming an executable model based on the machine learning model including the component selected by the user and the selected value of the component attribute. In some embodiments, step 1006 may include using a randomly generated input as a training archive. Further, in some embodiments, step 1006 may include randomly generating an input and using it as a training archive.

Step 1008 includes comparing the output with a desirable feature value. The desirable feature value may be selected by the user, or a classification criterion based on the nature and type of the training archive. In some embodiments, e.g., in supervised learning applications, the desirable feature value is a ground-truth value from a training archive. Accordingly, in some embodiments step 1008 includes comparing the output with a ground-truth value from the training archive for supervised learning. In some embodiments, step 1008 includes displaying for the user, in the graphical user interface, a comparison between the ground-truth value and the output, and allowing the user to stop executing the machine learning model based on the comparison.

Step 1010 includes modifying at least one coefficient in the component of the machine learning model based on a difference between the output from the machine learning model and the desirable feature value. In some embodiments, e.g., supervised learning applications, step 1010 includes modifying at least one coefficient in the component of the machine learning model based on a difference between the output from the machine learning model and the ground-truth value.

Figure 11:
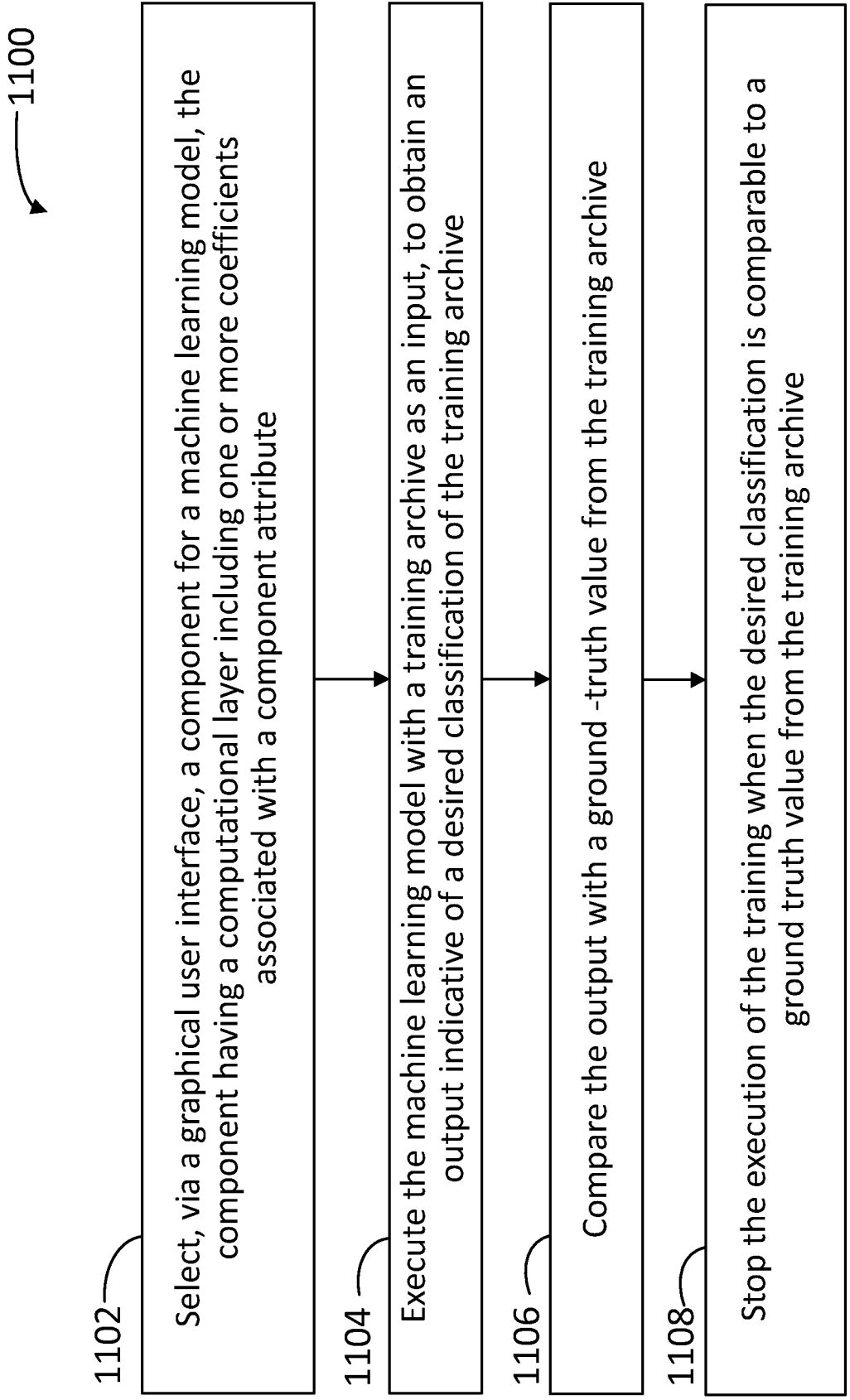
FIG. 11 is a flow chart illustrating steps in a method for training one or more machine learning models created, according to some embodiments.

FIG. 11 is a flow chart illustrating steps in a method 1100 for training one or more machine learning models created, according to some embodiments. At least one or more of the steps in method 1100 may be performed by a computer system in a client device or server, the client device and the server being communicatively coupled through a network via a communications module (e.g., client device 110, server 130, network 150, and communications modules 218). The computer system may include a memory storing instructions which, when executed by a processor, perform at least partially one or more of the steps in method 1100 (e.g., processors 212 and memories 220). In some embodiments, one or more steps in method 1100 is at least partially executed by an application installed in the client device and hosted by a model training engine in the server (e.g., GUI 222 and model training engine 240). Further, in some embodiments, one or more of the steps in method 1100 may be performed by a dashboard tool, a loading tool, a compiling tool, an execution tool, and a debugging tool, in the project management engine (e.g., dashboard tool 242, loading tool 244, compiling tool 246, debugging tool 248, and execution tool 250). Further, in some embodiments, data and information used in, or generated by, at least one of the steps in method 1100 may be stored in a database communicatively coupled to, and hosted by, the server (e.g., databases 252). Methods consistent with the present disclosure may include at least one or more of the steps in method 1100 performed in a different order. For example, in some embodiments, steps in method 1100 may be performed simultaneously, quasi-simultaneously, or overlapping in time.

Step 1102 includes selecting, via a graphical user interface, a component for a machine learning model, the component having a computational layer including one or more coefficients associated with a component attribute. In some embodiments, step 1102 includes dragging and dropping a component from a components palette onto the workspace panel. In some embodiments, step 1102 may include rearranging the components on the workspace as desired for clarity or purely aesthetical reasons. In some embodiments, step 1102 includes double clicking on a component and accessing a "Settings" window, including the component attributes. Accordingly, step 1102 may include customizing the component using pre-selected options to determine how the component works. In some embodiments, step 1102 includes pressing on a "Code" tab to access an editor with the source code associated with the component. In some embodiments, step 1102 includes applying all modifications and edits to the component to save all the settings and update the machine learning model.

In some embodiments, step 1102 includes selecting a preview of any other viewable variable inside the component or closing the preview window. Accordingly, the user may preview a sample of how any viewable variable inside of any component would look like.

Step 1104 includes executing the machine learning model with a training archive as an input, to obtain an output indicative of a desired classification of the training archive. In some embodiments, step 1104 includes selecting a data source to provide the training archive. In some embodiments, step 1104 includes using the loading tool to access a directory in the local memory, the remote memory, or the database.

Step 1106 includes comparing the output with a desirable feature value. The desirable feature value may be selected by the user, or a classification criterion based on the nature and type of the training archive. In some embodiments, e.g., in supervised learning applications, the desirable feature value may be a ground-truth value from a training archive. Accordingly, in supervised learning applications step 1106 may include comparing the output with a ground-truth value from the training archive.

Step 1108 includes stopping the execution of the training upon receipt of a user command, or when the desired classification is comparable to a ground-truth value from the training archive.

Hardware Overview

Figure 12:
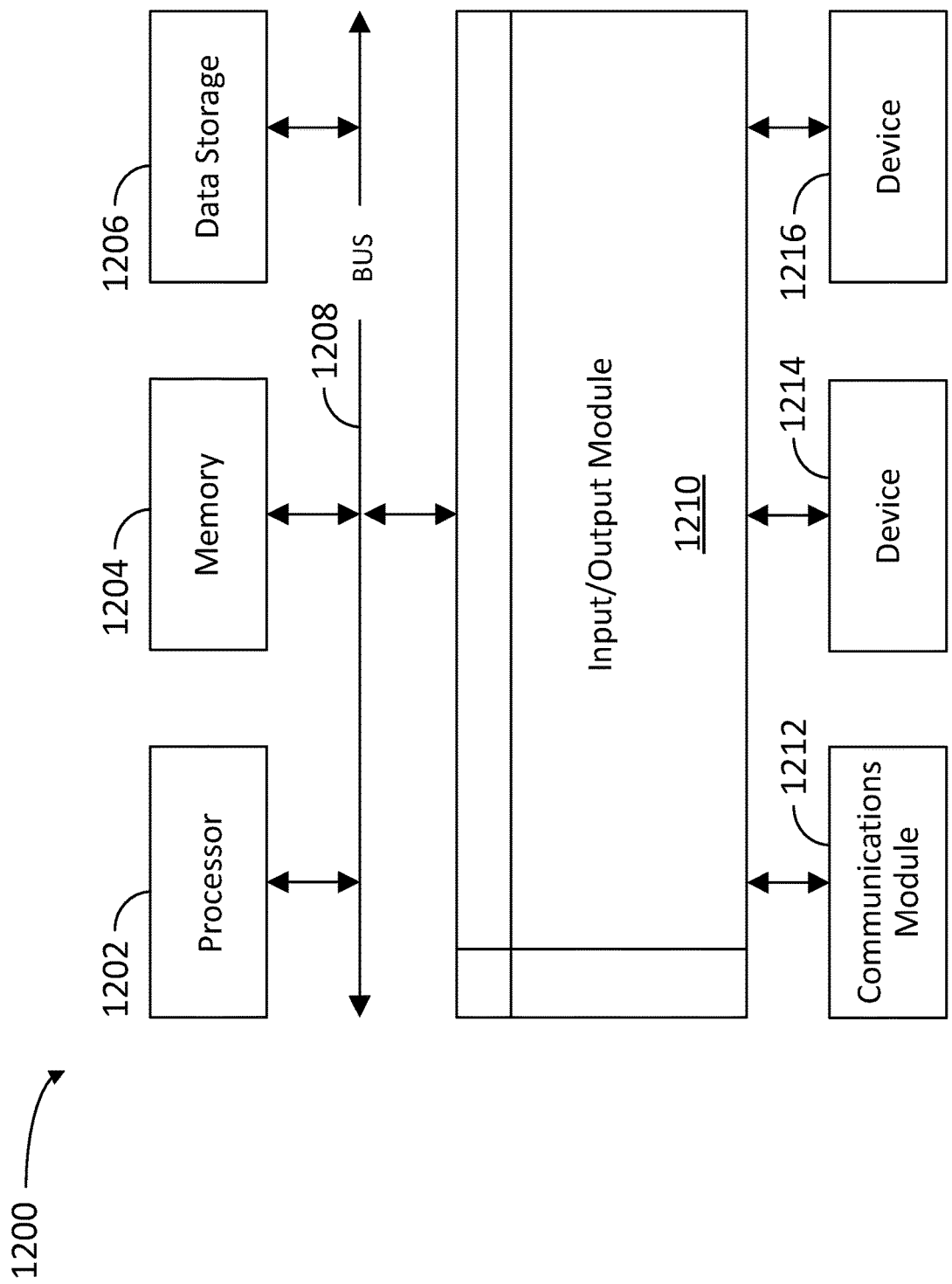
FIG. 12 is a block diagram illustrating an example computer system with which the client and server of FIGS. 1 and 2 and the methods of FIGS. 10-11 can be implemented.

FIG. 12 is a block diagram illustrating an exemplary computer system 1200 with which the client and server of FIGS. 1 and 2, and the methods of FIGS. 11 and 12 can be implemented. In certain aspects, the computer system 1200 may be implemented using hardware or a combination of software and hardware, either in a dedicated server, or integrated into another entity, or distributed across multiple entities.

Computer system 1200 (e.g., client 110 and server 130) includes a bus 1208 or other communication mechanism for communicating information, and a processor 1202 (e.g., processors 212) coupled with bus 1208 for processing information. By way of example, the computer system 1200 may be implemented with one or more processors 1202. Processor 1202 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 1200 can include, in addition to hardware, code that creates an execution environment for the computer program in question, e.g., code that constitutes processor firmware, a protocol stack, a database management system, an operating system, or a combination of one or more of them stored in an included memory 1204 (e.g., memories 220), such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 1208 for storing information and instructions to be executed by processor 1202. The processor 1202 and the memory 1204 can be supplemented by, or incorporated in, special purpose logic circuitry.

The instructions may be stored in the memory 1204 and implemented in one or more computer program products, e.g., one or more modules of computer program instructions encoded on a computer-readable medium for execution by, or to control the operation of, the computer system 1200, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 1204 may also be used for storing temporary variable or other intermediate information during execution of instructions to be executed by processor 1202.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 1200 further includes a data storage device 1206 such as a magnetic disk or optical disk, coupled to bus 1208 for storing information and instructions. Computer system 1200 may be coupled via input/output module 1210 to various devices. Input/output module 1210 can be any input/output module. Exemplary input/output modules 1210 include data ports such as USB ports. The input/output module 1210 is configured to connect to a communications module 1212. Exemplary communications modules 1212 (e.g., communications modules 218) include networking interface cards, such as Ethernet cards and modems. In certain aspects, input/output module 1210 is configured to connect to a plurality of devices, such as an input device 1214 (e.g., input device 214) and/or an output device 1216 (e.g., output device 216). Exemplary input devices 1214 include a keyboard and a pointing device, e.g., a mouse or a trackball, by which a user can provide input to the computer system 1200. Other kinds of input devices 1214 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 1216 include display devices, such as an LCD (liquid crystal display) monitor, for displaying information to the user.

According to one aspect of the present disclosure, the client 110 and server 130 can be implemented using a computer system 1200 in response to processor 1202 executing one or more sequences of one or more instructions contained in memory 1204. Such instructions may be read into memory 1204 from another machine-readable medium, such as data storage device 1206. Execution of the sequences of instructions contained in main memory 1204 causes processor 1202 to perform the process steps described herein. One or more processors in a multi-processing arrangement may also be employed to execute the sequences of instructions contained in memory 1204. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back-end component, e.g., a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. The communication network (e.g., network 150) can include, for example, any one or more of a LAN, a WAN, the Internet, and the like. Further, the communication network can include, but is not limited to, for example, any one or more of the following tool topologies, including a bus network, a star network, a ring network, a mesh network, a star-bus network, tree or hierarchical network, or the like. The communications modules can be, for example, modems or Ethernet cards.

Computer system 1200 can include clients and servers. A client and server are generally remote from each other and typically interact through a communication network. The relationship of client and server arises by virtue of computer programs running on the respective computers and having a client-server relationship to each other. Computer system 1200 can be, for example, and without limitation, a desktop computer, laptop computer, or tablet computer. Computer system 1200 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 1202 for execution. Such a medium may take many forms, including, but not limited to, non-volatile media, volatile media, and transmission media. Non-volatile media include, for example, optical or magnetic disks, such as data storage device 1206. Volatile media include dynamic memory, such as memory 1204. Transmission media include coaxial cables, copper wire, and fiber optics, including the wires forming bus 1208. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No clause element is to be construed under the provisions of 35 U.S.C. § 112, sixth paragraph, unless the element is expressly recited using the phrase "means for" or, in the case of a method clause, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method, comprising:
providing to a user, via a graphical user interface, a selection of components for a machine learning model, at least one component having a computational layer including one or more coefficients associated with a component attribute;
displaying, in the graphical user interface, a first component selected by the user, including a selected value of the component attribute;
executing the machine learning model with a training archive as an input, to obtain an output indicative of a desired feature of the training archive;
comparing the output with a desirable feature value;
allowing the user to connect an output from a second component to an input of the first component using a drag and drop tool in the graphical user interface to form a feedback loop based on a difference between the output from the machine learning model and the desirable feature value;
grouping one or more components into a layer container for handling the one or more components as a single unit in the graphical user interface; and
modifying at least one coefficient in the first component of the machine learning model based on a feedback to the first component by the second component.

2. The computer-implemented method of claim 1, wherein providing a selection of components for a machine learning model comprises providing, in the graphical user interface, a tools palette that groups the components into different categories including a data source category, a deep learning category, an operations category, a training category, and a machine learning category.

3. The computer-implemented method of claim 1, wherein providing a selection of components comprises providing a drag and drop tool to the user, and allowing the user to access a component from a tools palette and dropping the component in a workspace panel with the drag and drop tool.

4. The computer-implemented method of claim 1, further comprising providing, via the graphical user interface, multiple couplers between two or more components in the machine learning model, wherein each coupler is configured to provide an output from at least a first component as an input to at least a second component.

5. The computer-implemented method of claim 1, further comprising providing multiple tabs in a workspace panel of a graphical user interface, wherein each of the multiple tabs is configured to include and to execute a separate machine learning model.

6. The computer-implemented method of claim 1, wherein grouping one or more components into a layer container comprises assigning a same attribute of the one or more components to the layer container as a single component.

7. The computer-implemented method of claim 1, further comprising:
alerting the user, via a graphic indicator, of a compiling error in the machine learning model, including a graphical explanation of an error source; and
providing to the user, with a tutorial tool in the graphical user interface, a label and an explanatory note for a selected component or component attribute.

8. The computer-implemented method of claim 1, further comprising providing to the user, via the graphical user interface, a window to a text editor wherein the user may input textual commands in a source code language.

9. The computer-implemented method of claim 1, wherein executing the machine learning model comprises forming an executable model based on the machine learning model including the component selected by the user and the selected value of the component attribute.

10. The computer-implemented method of claim 1, further comprising displaying for the user, in the graphical user interface, a comparison between the desired feature value and the output, and allowing the user to stop executing the machine learning model based on the comparison.

11. A system, comprising:
a memory storing one or more instructions; and
one or more processors configured to execute at least one instruction and cause the system to:
provide to a user, via a graphical user interface, a selection of components for a machine learning model, at least one component having a computational layer including one or more coefficients associated with a component attribute;
display, in the graphical user interface, a first component selected by the user, including a selected value of the component attribute;
form an executable model based on the machine learning model including the component selected by the user and the selected value of the component attribute;
execute the machine learning model with a training archive as an input, to obtain an output;
compare the output with a ground-truth value from the training archive;
allow the user to connect an output from a second component to an input of the first component using a drag and drop tool in the graphical user interface to form a feedback loop based on a difference between the output from the machine learning model and a desirable feature value;
group one or more components into a layer container for handling the one or more components as a single unit in the graphical user interface; and
modify at least one coefficient in the first component of the machine learning model based on a feedback to the first component by the second component.

12. The system of claim 11, wherein the graphical user interface comprises a tools palette that groups the components into different categories including a training archive source, a neural network layer, an operations category, a training element category, and a machine learning category.

13. The system of claim 11, wherein the graphical user interface includes a drag and drop tool, configured to allow the user to access a component from a tool palette and drop the component in a workspace panel with the drag and drop tool.

14. The system of claim 11, wherein the graphical user interface comprises a tools palette including components in a training element category that comprises a comparator component and a back-propagation component or a genetic algorithm component.

15. The system of claim 11, wherein the graphical user interface comprises a tools palette including components in a machine learning category that includes a clustering component.

16. The system of claim 11, wherein the graphical user interface comprises a tools palette including components in a custom category that includes a custom component that enables a user to build a machine learning model component from a source code input.

17. A non-transitory, computer-readable medium storing instructions which, when executed by a processor, cause a computer to perform a method, the method comprising:
   providing to a user, via a graphical user interface, a selection of components for a machine learning model, at least one component having a computational layer including one or more coefficients associated with a component attribute;
   displaying, in the graphical user interface, a first component selected by the user, including a selected value of the component attribute;
   forming an executable model based on the machine learning model including the component selected by the user and the selected value of the component attribute;
   executing the machine learning model with a training archive as an input, to obtain an output;
   comparing the output with a ground-truth value from the training archive;
   allowing the user to connect an output from a second component to an input of the first component using a drag and drop tool in the graphical user interface to form a feedback loop based on a difference between the output from the machine learning model and a desirable feature value;
   grouping one or more components into a layer container for handling the one or more components as a single unit in the graphical user interface;
   modifying at least one coefficient in the first component of the machine learning model based on a feedback to the first component by the second component; and
   alerting the user, via a graphic indicator, of a compiling error in the machine learning model, including a graphical explanation of an error source.

18. The non-transitory, computer-readable medium of claim 17 wherein, in the method, providing a selection of components for a machine learning model comprises providing, in the graphical user interface, a tools palette that groups the components into different categories including a data source category, a deep learning category, an operations category, a training category, and a machine learning category.

19. The non-transitory, computer-readable medium of claim 17 wherein, in the method, providing a selection of components comprises providing a drag and drop tool to the user, and allowing the user to access a component from a tools palette and dropping the component in a workspace panel with the drag and drop tool.

20. The non-transitory, computer-readable medium of claim 17, wherein the method further comprises providing, via the graphical user interface, multiple couplers between two or more components in the machine learning model, wherein each coupler is configured to provide an output from at least a first component as an input to at least a second component.

* * * * *